United States Patent
Ong

(10) Patent No.: US 11,082,910 B2
(45) Date of Patent: Aug. 3, 2021

(54) SYSTEMS AND METHODS FOR PRIORITIZING SERVICE SET IDENTIFIERS ON A WIRELESS ACCESS POINT

(71) Applicant: Comcast Cable Communications, LLC, Philadelphia, PA (US)

(72) Inventor: Ivan Ong, Malvern, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 96 days.

(21) Appl. No.: 15/043,820

(22) Filed: Feb. 15, 2016

(65) Prior Publication Data
US 2017/0238239 A1    Aug. 17, 2017

(51) Int. Cl.
| H04W 48/10 | (2009.01) |
| H04W 48/18 | (2009.01) |
| H04W 48/02 | (2009.01) |
| H04W 88/06 | (2009.01) |
| H04W 84/12 | (2009.01) |

(52) U.S. Cl.
CPC ........... *H04W 48/10* (2013.01); *H04W 48/02* (2013.01); *H04W 48/18* (2013.01); *H04W 84/12* (2013.01); *H04W 88/06* (2013.01)

(58) Field of Classification Search
CPC .................................................... H04W 48/10
See application file for complete search history.

(56) References Cited

U.S. PATENT DOCUMENTS

| 2003/0163579 | A1* | 8/2003 | Knauerhase | H04W 16/06 709/230 |
| 2005/0147073 | A1* | 7/2005 | Hietalahti | H04W 4/00 370/338 |
| 2007/0243888 | A1 | 10/2007 | Faccin | |
| 2008/0117836 | A1* | 5/2008 | Savoor | H04W 72/06 370/254 |
| 2015/0245278 | A1 | 8/2015 | Scahill | |
| 2016/0014689 | A1 | 1/2016 | Malinen et al. | |
| 2016/0029295 | A1* | 1/2016 | Nagasaka | H04W 48/18 370/237 |
| 2016/0044673 | A1* | 2/2016 | Liu | H04W 72/0453 370/329 |
| 2016/0192230 | A1* | 6/2016 | Metke | H04W 12/06 370/338 |
| 2016/0249267 | A1* | 8/2016 | Ho | H04W 76/10 |
| 2017/0071011 | A1* | 3/2017 | Jin | H04W 72/1289 |

OTHER PUBLICATIONS

Gast, Matthew 802.11 Wireless Networks: The Definitive Guide O'Reilly 2nd Edition Apr. 25, 2005. Chapter 3 Frame Format.*
Ward and Van Spriel Internet Newsgroup Discussion—Recommended Beacon Interval for 2.4 GHz vs 5 GHz dual band networks Jan. 5, 2015.*

* cited by examiner

*Primary Examiner* — Jeffrey M Rutkowski
*Assistant Examiner* — Basil Ma
(74) *Attorney, Agent, or Firm* — BakerHostetler

(57) ABSTRACT

Systems and methods for managing a network are disclosed. One method can comprise causing transmission of a first beacon and a second beacon associated with available networks. After receiving a first request associated with the first beacon, the first request may be suppressed. Thereafter a second request may be received from the user device associated with the second beacon, and access may be provided to a network in response to the second request.

16 Claims, 9 Drawing Sheets

SYSTEMS AND METHODS FOR PRIORITIZING SERVICE SET IDENTIFIERS ON A WIRELESS ACCESS POINT

BACKGROUND

A network such as a local area network can comprise one or more network devices such as access points (AP) to provide a means for one or more user devices to communicate with and/or over the network. A network device can comprise a device that allows wired and/or wireless user devices to connect to a wired network using Wi-Fi, Bluetooth, or related standards. A network device can be configured to provide access to one or more services (e.g., private network, public network, network-related services). In certain locations such as crowed spaces or multi-dwelling units, where many network devices may be present, network devices can provide interfering wireless signals and excessive demand for access to a network. Furthermore, as deployment density for residential and other wireless gateway routers increases, the number of transmitted network identifiers, such as service set identifier (SSID) beacons, increases. As such, the Quality of Experience (QoE) for a user is negatively affected.

These and other shortcomings are addressed by the present disclosure.

SUMMARY

The current connectivity behavior for a typical user device (e.g., mobile device) is to associate to the last known network identifier, such an SSID, without a third party connection manager instructing the connectivity order. In situations where a user device is outside a premises of the user (e.g., user residence), the user device may associate to a public hotspot or access point, thereby connecting to a public network. After returning to the premises, the user device may receive multiple network identifiers from a home wireless gateway. As an example, the home wireless gateway may transmit network identifiers for a public network and a home network. Since the user device most recently connected to the public network via the public hotspot, the user device may again attempt to associate to the public network via a home wireless gateway router. Such association with the public network prohibits access to various private operations associated with a home network, such as, a home automation interface, downloadable content, home network applications (such as in house music), and other services associated with a private network (e.g., home network). This may negatively affect the user experience.

In one aspect, the systems and methods of the preset disclosure relate to prioritizing a network identifier, such as an SSID, that is available via an network access device such as a wireless access point. As an example, a network device such as a home wireless gateway can cause transmission of a first network identifier and a second network identifier. A user device in receipt of the first network identifier can request to join the network associated with the first network identifier. When the network device receives the request associated with the first network identifier, the network device can suppress (e.g., ignore, delay, or drop) the request in favor of a subsequent request. The user device can then transmit a second request to join the network associated with the second network identifier. In this instance, the network device can process the second request to allow the user device to join the network. Other rules and processes can be used to suppress and/or prioritize one network identifier over other network identifiers in order to control the network to which certain devices may join. For example, if a certain user has preferences for joining a public network at certain times or for certain activities, a digital fingerprint associated with the user may be developed and applied to govern the dynamic suppression of certain network identifiers. As such, users can connect to various networks via various public and private access points and may still have the access to the preferred network, for example.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
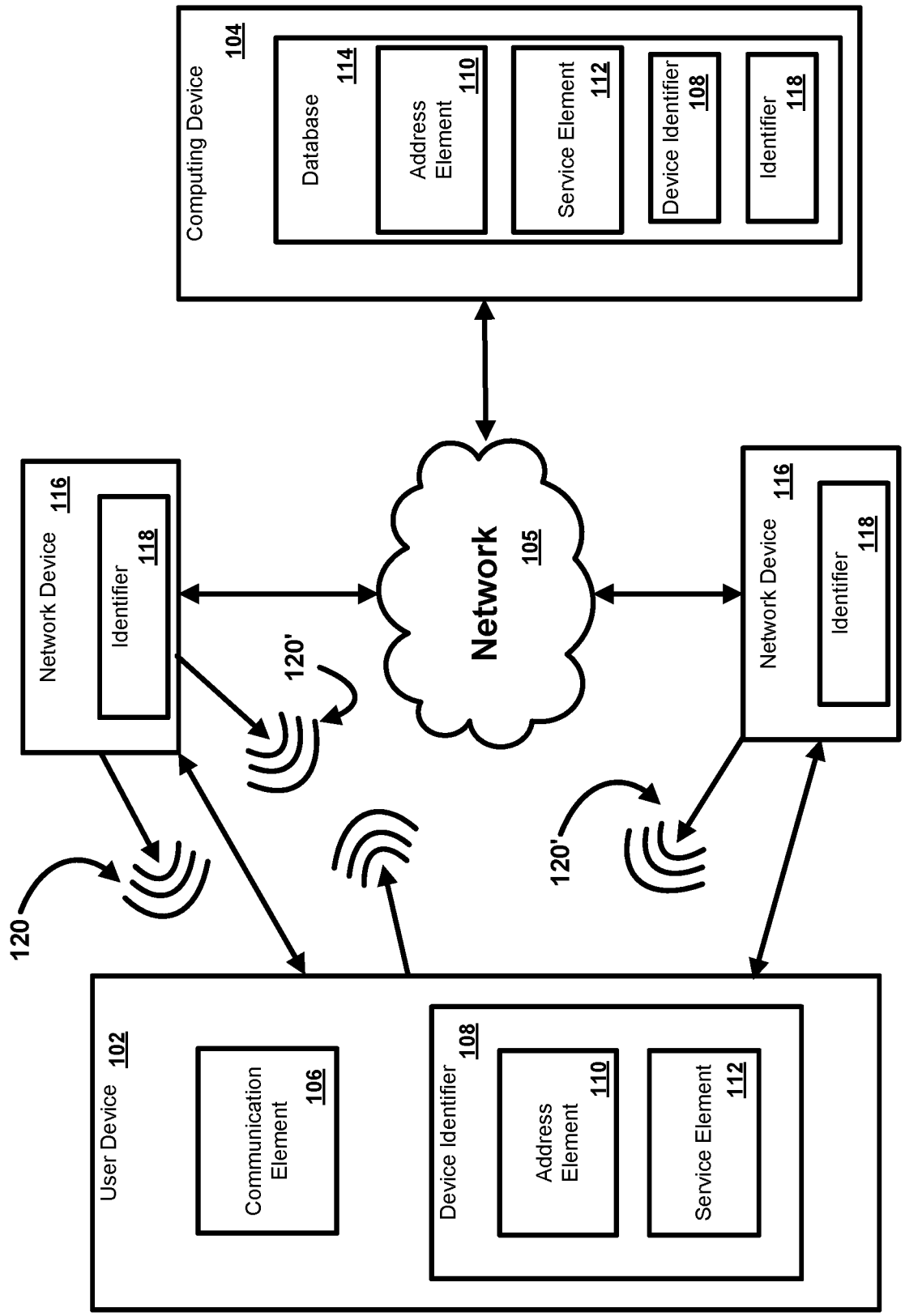
FIG. 1 is a block diagram of an example system and network.

In an aspect of the disclosure, a system can be configured to provide services such as network-related services. The system can be configured to manage network identifier (e.g., SSID) transmission to effect prioritization of user devices associating with one or more networks. FIG. 1 illustrates various aspects of an exemplary environment in which the present methods and systems can operate. The present disclosure is relevant to systems and methods for providing services to a user device, for example. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

The network and system can comprise a user device 102 in communication with a computing device 104, such as a server, for example. The computing device 104 can be disposed locally or remotely relative to the user device 102. The user device 102 and the computing device 104 can be in communication via a private and/or public network 105, such as the Internet. Other forms of communications can be used, such as wired and wireless telecommunication channels, for example.

The user device 102 can be an electronic device, such as a computer, a smartphone, a laptop, a tablet, a set top box, a display device, or other device capable of communicating with the computing device 104. The user device 102 can comprise a communication element 106 for providing an interface to a user to interact with the user device 102 and/or the computing device 104. The communication element 106 can be any interface for presenting information to the user and receiving a user feedback, such as a application client or a web browser (e.g., Internet Explorer, Mozilla Firefox, Google Chrome, Safari, or the like). Other software, hardware, and/or interfaces can be used to provide communication between the user and one or more of the user device 102 and the computing device 104. As an example, the communication element 106 can request or query various files from a local source and/or a remote source. As a further example, the communication element 106 can transmit data to a local or remote device, such as the computing device 104.

The user device 102 can be associated with a user identifier or device identifier 108. The device identifier 108 can be any identifier, token, character, string, or the like, for differentiating one user or user device (e.g., user device 102) from another user or user device. In a further aspect, the device identifier 108 can identify a user or user device as belonging to a particular class of users or user devices. The device identifier 108 can comprise information relating to the user device, such as a manufacturer, a model or type of device, a service provider associated with the user device 102, a state of the user device 102, a locator, and/or a label or classifier. Other information can be represented by the device identifier 108.

The device identifier 108 can comprise an address element 110 and a service element 112. The address element 110 can be an internet protocol address, a MAC address, a network address, an Internet address, or the like. The address element 110 can be relied upon to establish a communication session between the user device 102 and the computing device 104 or other devices and/or networks. The address element 110 can be used as an identifier or locator of the user device 102. In an aspect, the address element 110 can be persistent for a particular network and/or location.

The service element 112 can comprise an identification of a service provider associated with the user device 102 and/or with the class of user device 102. The service element 112 can comprise information relating to or provided by a communication service provider (e.g., Internet service provider) that is providing or enabling communication services to the user device 102. The service element 112 can comprise information relating to a preferred service provider for one or more particular services relating to the user device 102. The address element 110 can be used to identify or retrieve the service element 112, or vise versa. One or more of the address element 110 and the service element 112 can be stored remotely from the user device 102 and retrieved by one or more devices, such as the user device 102 and the computing device 104. Other information can be represented by the service element 112.

The computing device 104 can be a server for communicating with the user device 102. The computing device 104 can communicate with the user device 102 for providing services. In an aspect, the computing device 104 can allow the user device 102 to interact with remote resources, such as data, devices, and files. The computing device can be configured as central location (e.g., a headend, or processing facility), which can receive content (e.g., data, input programming) from multiple sources. The computing device 104 can combine the content from the various sources and can distribute the content to user (e.g., subscriber) locations via a distribution system.

The computing device 104 can manage the communication between the user device 102 and a database 114 for sending and receiving data therebetween. As an example, the database 114 can store a plurality of data sets (e.g., mapped identifiers, relational tables, user device identifiers (e.g., identifier 108) or records, network device identifiers (e.g., identifier 118), or other information). As a further example, the user device 102 can request and/or retrieve a file from the database 114. In an aspect, the database 114 can store information relating to the user device 102, such as the address element 110 and/or the service element 112. As an example, the computing device 104 can obtain the device identifier 108 from the user device 102 and retrieve information from the database 114, such as the address element 110 and/or the service elements 112. As another example, the computing device 104 can obtain the address element 110 from the user device 102 and can retrieve the service element 112 from the database 114, or vice versa. As a further example, the computing device 104 can obtain a MAC address from the user device 102 and can retrieve a local IP address from the database 114. As such, the local IP address can be provisioned to the user device 102, for example, as the address element 110 to facilitate interaction between the user device 102 and a network (e.g., LAN). Any information can be stored in and retrieved from the database 114. The database 114 can be disposed remotely from the computing device 104 and accessed via direct or indirect connection. The database 114 can be integrated with the computing device 104 or some other device or system.

One or more network devices 116 can be in communication with a network, such as network 105. As an example, one or more of the network devices 116 can facilitate the connection of a device, such as the user device 102, to the network 105. As a further example, one or more of the network devices 116 can be configured as a network gateway. In an aspect, one or more network devices 116 can be configured to allow one or more wireless devices to connect to a wired and/or wireless network using Wi-Fi, Bluetooth or similar standard.

The network devices 116 can be configured to transmit and receive wireless signals (e.g., RF signals) over a particular frequency band. Such bands can include 2.4 GHz band, 5 Ghz band, and 60 GHz band among others. The frequency band can be defined by one or more communication protocols or standards such as 802.xx, for example 802.11(ac, n, a, b, g, etc.). Other standards and protocols known or later developed may be used in a similar manner. Each of the frequency bands can be sub-divided into one or more communication channels. As an example, the 2.4 GHz band can comprise frequencies between 2400 MHz and 2500 MHz and can be divided into 14 sub channels (e.g., 20 MHz sub-band channels). As such, each of the network devices 116 can be configured to transmit and receive wireless signals over a select one or more of the channels of a particular frequency band.

The network devices 116 can be configured as a mesh network. One or more network devices 116 can comprise a dual band wireless network device. As an example, the network devices 116 can be configured with a first service set identifier (SSID) (e.g., associated with a user network or private network) to function as a local network for a particular user or users. As a further example, the network devices 116 can be configured with a second service set identifier (SSID) (e.g., associated with a public/community network or a hidden network) to function as a secondary network or redundant network for connected communication devices.

One or more network devices 116 can comprise an identifier 118. One or more identifiers can be a media access control address (MAC address). As a further example, one or more identifiers 118 can be a unique identifier for facilitating communications on the physical network segment. In an aspect, each of the network devices 116 can comprise a distinct identifier 118. As an example, the identifiers 118 can be associated with a physical location of the network devices 116.

The user device 102 can connect to a first network, such as a LAN associated with a first SSID, via a network device (e.g., network device 116, gateway device, computing device 104, server, router, etc.) As an example, the user device 102 can discover a beacon 120 transmitted (e.g., wirelessly) by the network device 116. The beacon 120 can comprise a beacon frame. The beacon 120 can comprise information to facilitate a connection between the user device 102 and the network device 116. As a further example, a second beacon 120' can be transmitted by the same or another network device 116 over the same or different communication channel as the beacon 120.

The user device 102 can scan (e.g., RF scan) an area for beacons, such as beacon 120, 120'. The scan can be continuous or periodic such as at pre-defined intervals. Once a beacon is discovered, the user device 102 can initiate an association process including transmitting a probe request (e.g., seeking an SSID to associate), authenticating the user device 102 or user thereof (e.g., in response to a probe response from the network device 116), and association with the network (e.g., SSID) via the network device 116.

In the case of the user returning home, the user device 102 has the potential to associate with the public SSID as the last known good network based on the inherent behavior for SSID preference of most device WiFi chipsets and/or associations made outside the home. As such, the systems and methods of the present disclosure provide mechanisms for prioritizing device association with SSIDs. As an example, the network device 116 can be configured to reject all initial probe request to associate with an SSID associated with a first network (e.g., public hotspot, public SSID, etc.) from the user device 102. Such rejection can be dependent upon the device identifier 108 and may be limited to a particular time frame. As another example, the network device 116 can be configured to delay initial probe request to associate with an SSID associated with a first network (e.g., public hotspot, public SSID, etc.) from the user device 102. Such delay can be dependent upon the device identifier 108 and may be limited to a particular time frame.

As a further example, a digital fingerprint can be determined representing habits, preferences, or historical associations of a particular device or user. As such the network device 116 can suppress, stagger, or delay a public SSID in favor of a private SSID during the expected duration when a device having a particular client MAC address will return home. Alternatively or additionally, a state table can be used to issue a targeted probe response upon receipt of client traffic originating from behind the home wireless gateway via the DOCSIS network. As such, the gateway can either disconnect/de-authenticate if the client is already connected to a non-home SSID and then issue a probe response directly to the client MAC to associate to the proper SSID (e.g., Home network).

Certain methods may require altering values within the 802.11 MAC Header or Fixed/Variable Frame based on intelligent gathering. However, the above proposed associate processes can be implemented without altering the structure of a 802.11 frame, making it non-disruptive from a client perspective and allowing for widespread adoption by most customer premises equipment (CPE) devices.

In the context of a standard 802.11 frame format that is exchanged between client and access point, a frame 'subtype' field can be defined as a beacon, probe request, probe response, etc. As discussed herein, the proposed methods can define one or more fields a response from the network device 116 to the user device 102 can include a subtype field defined as a probe response, a destination address field defined as an address associated with the user device 102, and a data block defining the SSID to be associated. Further, the subtype field of the frame format can be defined as a beacon and a beacon interval value can be defined within the mandatory MAC header of the variable data block to effect a more or less frequent transmission of a particular SSID beacon.

Figure 2:
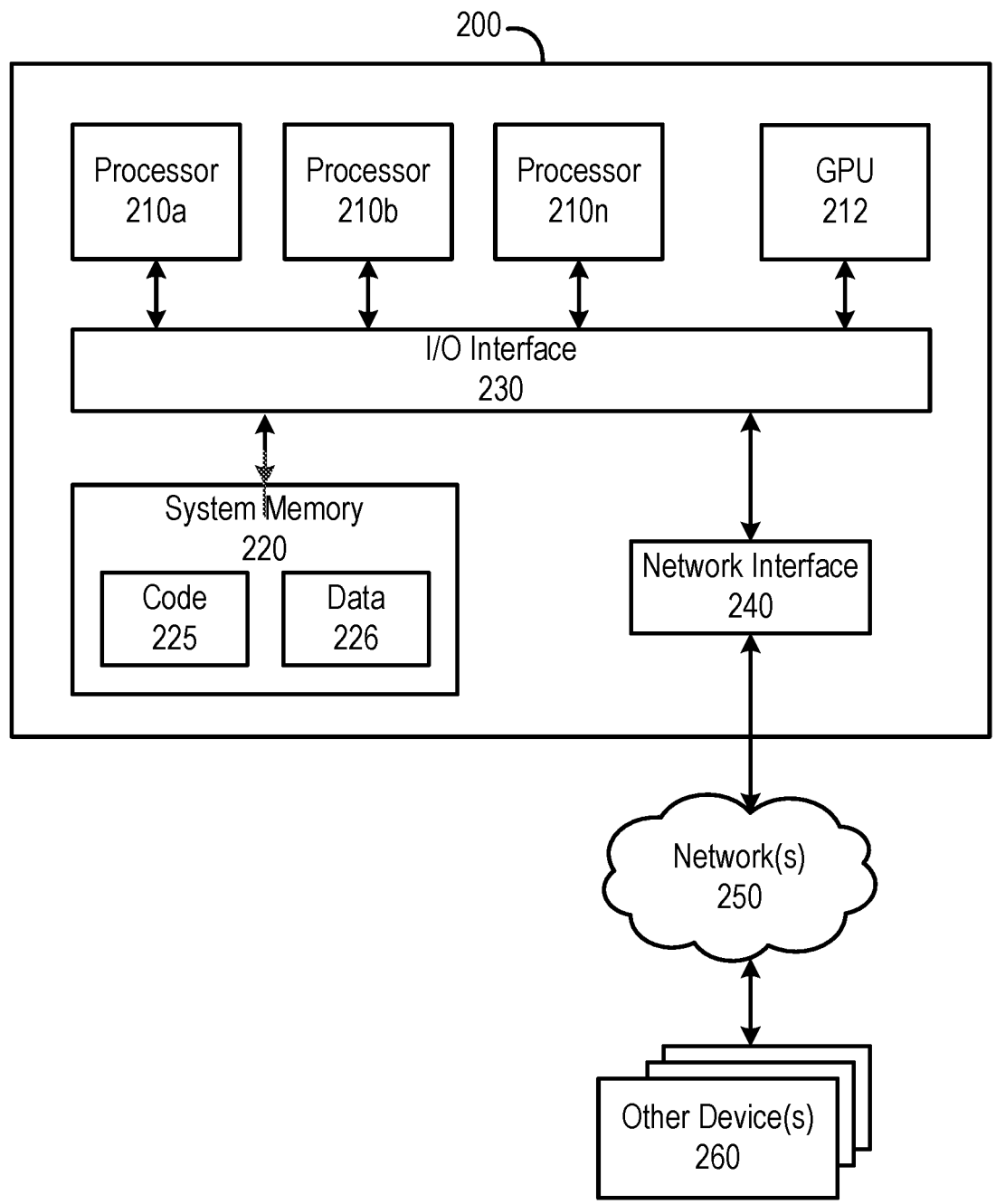
FIG. 2 is a block diagram of an example computing device.

The methods and systems can be implemented on a computing system, such as computing device 200 as illustrated in FIG. 2 and described below. By way of example, one or more of the user device 102 and the computing device 104 of FIG. 1 can be embodied as the computing device 200 as illustrated in FIG. 2. Similarly, the methods and systems disclosed can utilize one or more computers to perform one or more functions in one or more locations. FIG. 2 depicts a general-purpose computer system that includes or is configured to access one or more computer-accessible media. In the illustrated aspect, a computing device 200 may include one or more processors 210a, 210b, and/or 210n (which may be referred herein singularly as the processor 210 or in the plural as the processors 210) coupled to a system memory 220 via an input/output (I/O) interface 230. The computing device 200 may further include a network interface 240 coupled to an I/O interface 230.

In various aspects, the computing device 200 may be a uniprocessor system including one processor 210 or a multiprocessor system including several processors 210 (e.g., two, four, eight, or another suitable number). The processors 210 may be any suitable processors capable of executing instructions. For example, in various aspects, the processor(s) 210 may be general-purpose or embedded processors implementing any of a variety of instruction set architectures (ISAs), such as the x86, PowerPC, SPARC, or MIPS ISAs, or any other suitable ISA. In multiprocessor systems, each of the processors 210 may commonly, but not necessarily, implement the same ISA.

A graphics processing unit ("GPU") 212 may participate in providing graphics rendering and/or physics processing capabilities. A GPU may, for example, include a highly parallelized processor architecture specialized for graphical computations. In some aspects, the processors 210 and the GPU 212 may be implemented as one or more of the same type of device.

The system memory 220 may be configured to store instructions and data accessible by the processor(s) 210. In various aspects, the system memory 220 may be implemented using any suitable memory technology, such as static random access memory ("SRAM"), synchronous dynamic RAM ("SDRAM"), nonvolatile/Flash®-type memory, or any other type of memory. In the illustrated aspect, program instructions and data implementing one or more desired functions, such as those methods, techniques and data described above, are shown stored within the system memory 220 as code 225 and data 226.

The I/O interface 230 may be configured to coordinate I/O traffic between the processor(s) 210, the system memory 220 and any peripherals in the device, including a network interface 240 or other peripheral interfaces. In some aspects, the I/O interface 230 may perform any necessary protocol, timing or other data transformations to convert data signals from one component (e.g., the system memory 220) into a format suitable for use by another component (e.g., the processor 210). In some aspects, the I/O interface 230 may include support for devices attached through various types of peripheral buses, such as a variant of the Peripheral Component Interconnect (PCI) bus standard or the Universal Serial Bus (USB) standard, for example. In some aspects, the function of the I/O interface 230 may be split into two or more separate components, such as a north bridge and a south bridge, for example. Also, in some aspects some or all of the functionality of the I/O interface 230, such as an interface to the system memory 220, may be incorporated directly into the processor 210.

The network interface 240 may be configured to allow data to be exchanged between the computing device 200 and other device or devices 260 attached to a network or networks 250, such as other computer systems or devices, for example. In various aspects, the network interface 240 may support communication via any suitable wired or wireless general data networks, such as types of Ethernet networks, for example. Additionally, the network interface 240 may support communication via telecommunications/telephony networks, such as analog voice networks or digital fiber communications networks, via storage area networks, such as Fibre Channel SANs (storage area networks), or via any other suitable type of network and/or protocol.

In some aspects, the system memory 220 may be one aspect of a computer-accessible medium configured to store program instructions and data as described above for implementing aspects of the corresponding methods and apparatus. However, in other aspects, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device the 200 via the I/O interface 230. A non-transitory computer-accessible storage medium may also include any volatile or non-volatile media, such as RAM (e.g., SDRAM, DDR SDRAM, RDRAM, SRAM, etc.), ROM, etc., that may be included in some aspects of the computing device 200 as the system memory 220 or another type of memory. Further, a computer-accessible medium may include transmission media or signals, such as electrical, electromagnetic or digital signals, conveyed via a communication medium, such as a network and/or a wireless link, such as those that may be implemented via the network interface 240. Portions or all of multiple computing devices, such as those illustrated in FIG. 2, may be used to implement the described functionality in various aspects; for example, software components running on a variety of different devices and servers may collaborate to provide the functionality. In some aspects, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

Figure 3:
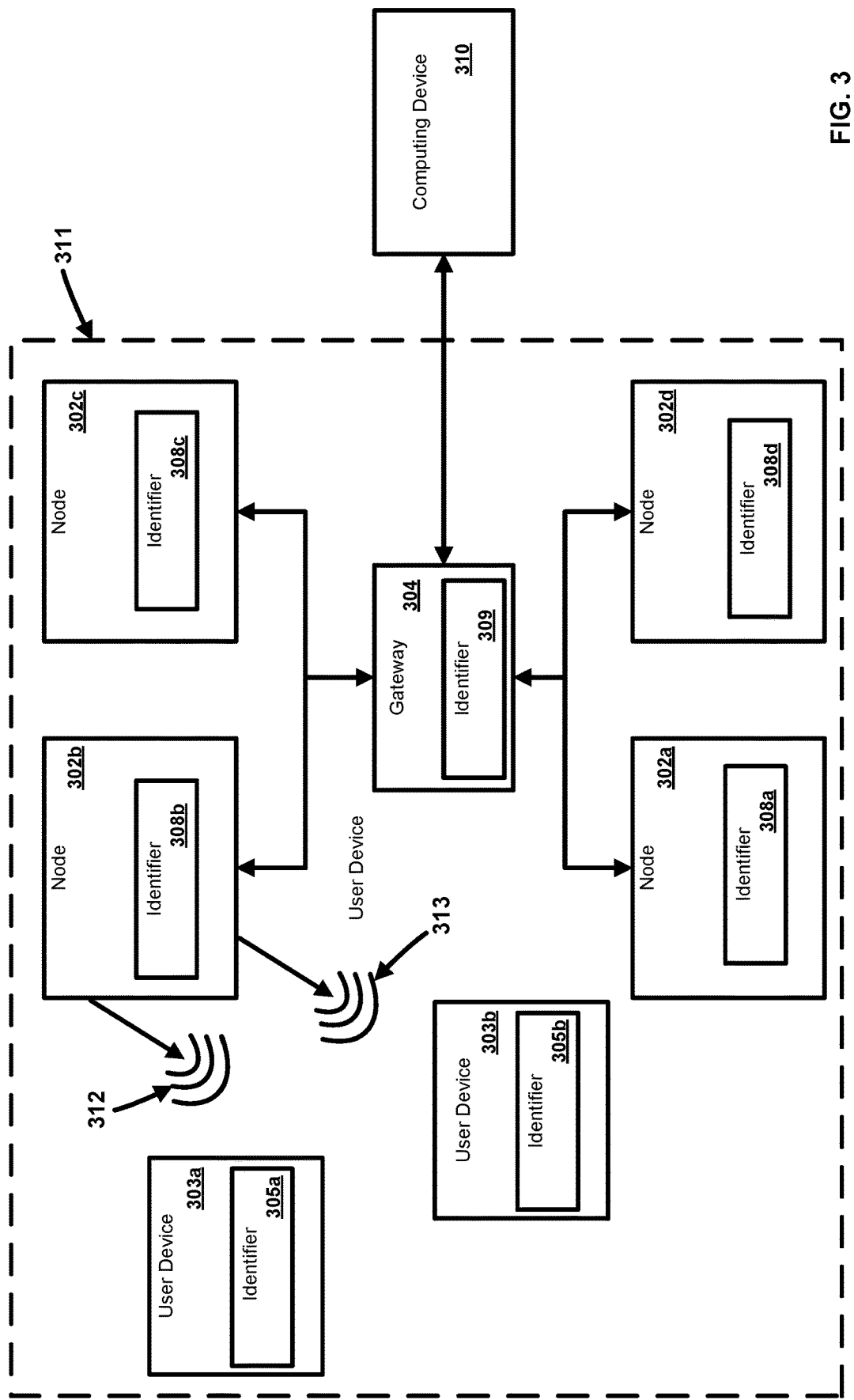
FIG. 3 is a block diagram of an example system and network.

FIG. 3 illustrates an exemplary system and network. A plurality of nodes 302a, 302b, 302c, 302d can be in communication with one or more user devices 303a, 303b and a gateway 304. As an example, one or more nodes 302a, 302b, 302c, 302d can be a network device, router, switch, communication device, or the like. As another example, one or more user devices 303a, 303b can be an electronic device, such as a computer, a smartphone, a laptop, a tablet, a set top box, a display device, or other device capable of communicating with one or more of the nodes 302a, 302b, 302c, 302d of the network.

Each of the user devices 303a, 303b can be associated with an identifier 305a, 305b, such as a user identifier or device identifier. As an example, the identifier 305a, 305b can be any identifier, token, character, string, or the like, for differentiating one user or user device (e.g., user device 303a, 303b) from another user or user device. In a further aspect, the identifier 305a, 305b can identify a user or user device as belonging to a particular class of users or user devices. As a further example, the identifier 305a, 305b can comprise information relating to the user device, such as a manufacturer, a model or type of device, a service provider associated with the user device 303a, 303b, a state of the user device 303a, 303b, a locator, and/or a label or classifier. Other information can be represented by the identifier 305a, 305b. In an aspect, the identifier 305a, 305b can be an internet protocol address, a MAC address, a network address, an Internet address, or the like. As an example, the identifier 305a, 305b can be relied upon to establish a communication session between the user device 303a, 303b and the computing device 310 or other devices (e.g., nodes 302a, 302b, 302c, 302d) and/or networks. As a further example, the identifier 305a, 305b can be used as an identifier or locator of the user device 303a, 303b. In an aspect, the identifier 305a, 305b can be persistent for a particular network and/or location.

One or more of the nodes 302a, 302b, 302c, 302d can be configured to communicate with another of the nodes 302a, 302b, 302c, 302d and/or the gateway 304 via one or more communication paths. The one or more communication paths can comprise one or more uninterrupted communication links, sequential links, pre-defined paths or links, and/or intervening nodes. Links can comprise a single point to point connection between two devices or network devices. Paths can comprise one or more links. As an example, one or more of the communication paths can comprise one or more of the nodes 302a, 302b, 302c, 302d. As a further example, one or more of the nodes 302a, 302b, 302c, 302d can be configured as a mesh network. One ore more of the communication paths can be configured to transmit one or more services. The nodes 302a, 302b, 302c, 302d can be configured as a network, such as a mesh network.

One or more of the nodes 302a, 302b, 302c, 302d can comprise an identifier 308a, 308b, 308c, 308d. As an example, one or more identifiers can be a media access control address (MAC address). Any uniquely identifiable attribute that can be linked to a location can be used as the identifier 308a, 308b, 308c, 308d. Such attributes can comprise one or more of an IP Address, serial number, latitude/longitude, geo-encoding, custom assigned unique identifier, global unique identifier (GUID), and the like. As a further example, one or more identifiers 308a, 308b, 308c, 308d can be a unique identifier for facilitating communications on the physical network segment. In an aspect, each of the nodes 302*a*, 302*b*, 302*c*, 302*d* can comprise a distinct identifier 308*a*, 308*b*, 308*c*, 308*d*. As an example, the identifiers 308*a*, 308*b*, 308*c*, 308*d* can be associated with a physical location of the nodes 302*a*, 302*b*, 302*c*, 302*d*.

One or more nodes 302*a*, 302*b*, 302*c*, 302*d* can be in communication with the gateway 304. One or more nodes 302*a*, 302*b*, 302*c*, 302*d* and/or the gateway 304 can be configured to allow one or more wireless devices to connect to a wired and/or wireless network using Wi-Fi, Bluetooth or similar standard. The gateway 304 can comprise an identifier 309. As an example, one or more identifiers 309 can be a media access control address (MAC address). As a further example, one or more identifiers 309 can be a unique identifier for facilitating communications on the physical network segment. As an example, the gateway 304 can be or comprise a DOCSIS device. The gateway 304 can be disposed in a premises 311, for example a user's home or business. As such, the gateway 304 can operate to provide a private network such as a home network with associated home services.

A computing device 310 can be in communication with a network device, such as gateway 304. As an example, the computing device 310 can be or comprise an application server, management device, auto-configuration server (ACS), AAA server, etc. In another aspect, the computing device 310 is located within a network, such as a wide area network (WAN).

The user devices 303*a*, 303*b* can connect to a network via a network device, such as node 302*b*. The user device 303*a*, 303*b* can discover a transmission signal 312, 313 (e.g., downlink, beacon, etc.) transmitted (e.g., wirelessly) by the node 302*b*. The transmission signals 312, 313 can be transmitted over a particular frequency band. Such bands can include 2.4 GHz band, 5 Ghz band, and 60 GHz band among others. The frequency band can be defined by one or more communication protocols or standards such as 802.11(ac, n, a, b, g, etc.).

The user devices 303*a*, 303*b* can scan (e.g., RF scan) an area for beacons, such as transmission signals 312, 313. The scan can be continuous or periodic such as at pre-defined intervals. Once a beacon is discovered, the user devices 303*a*, 303*b* can initiate an association process including transmitting a probe request (e.g., seeking an SSID to associate), authenticating the user devices 303*a*, 303*b* or user thereof (e.g., in response to a probe response from the nodes 302*a*, 302*b*, 302*c*, 302*d* and/or the gateway 304), and association with the network (e.g., SSID) via the nodes 302*a*, 302*b*, 302*c*, 302*d* and/or the gateway 304.

Figure 4:
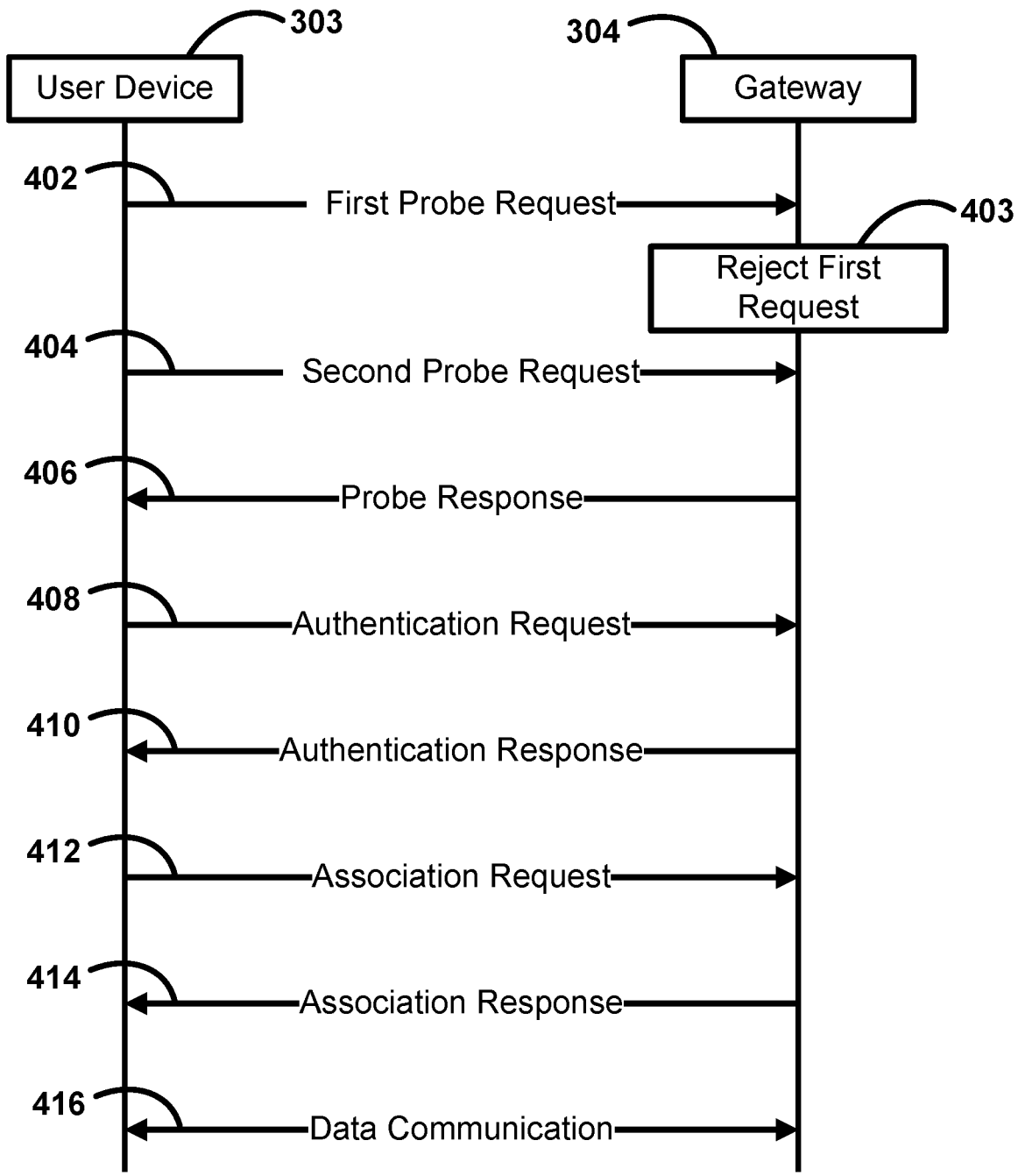
FIG. 4 is a communication flow diagram of an example method.

The nodes 302*a*, 302*b*, 302*c*, 302*d* and/or the gateway 304 can be configured to suppress (e.g., reject, delay, limit, etc.) all initial probe request to associate with the transmission signal 312 in favor of transmission signal 313, as illustrated in FIG. 4. Such suppression can be dependent upon the device identifier 305*a*, 305*b* and may be limited to a particular time frame. Any signal and/or request may be suppressed or prioritized in a similar manner to control the association of one or more devices to a particular network. Other suppression techniques such as Transmit Power Control (TPC) can be used to control the coverage range of a particular SSID. For example, a first SSID may have a broader coverage area than a second SSID to effect suppression of the second SSID. Other variables may be manipulated to prioritize SSIDs.

Figure 5:
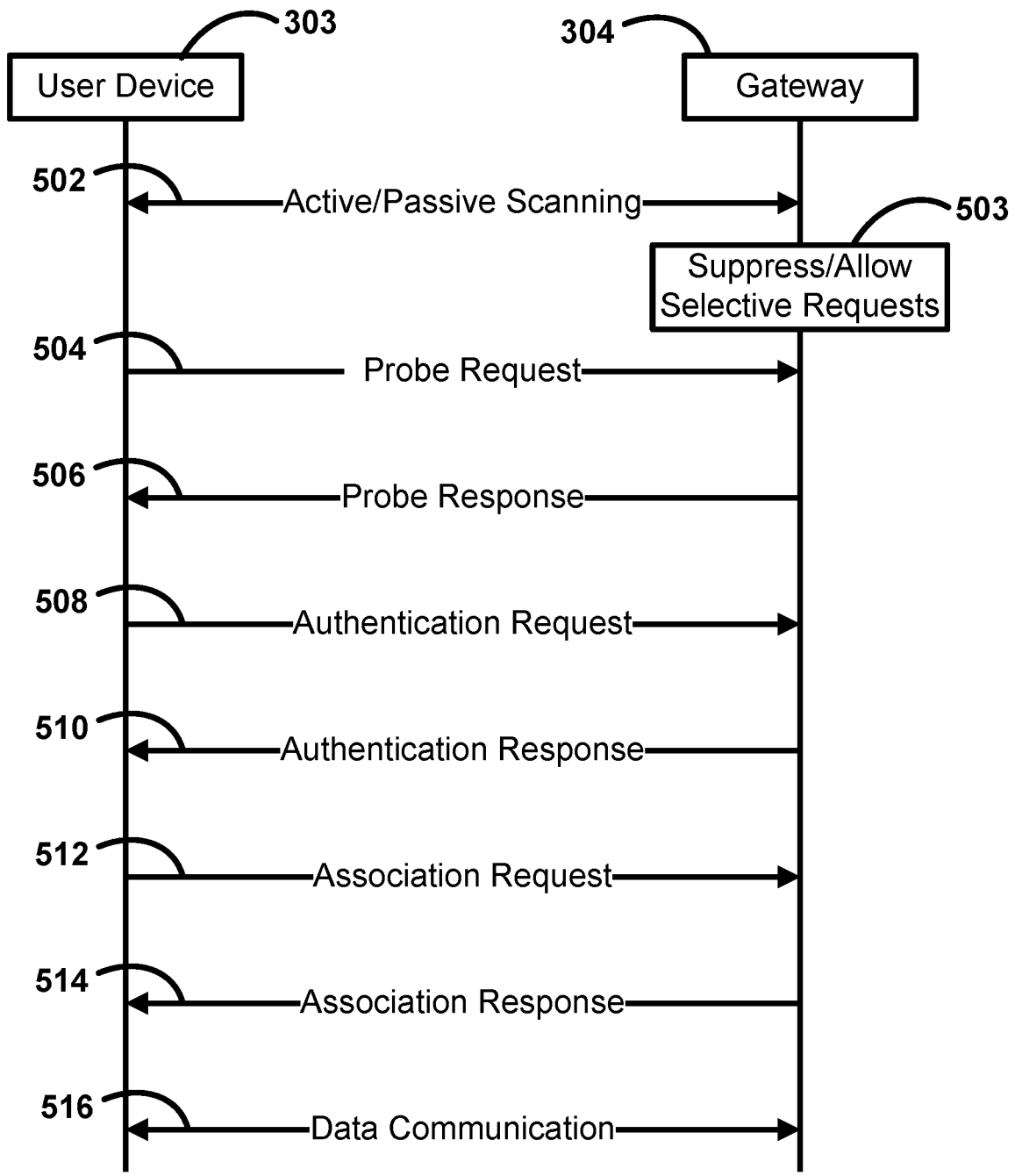
FIG. 5 is a communication flow diagram of an example method.
Figure 6:
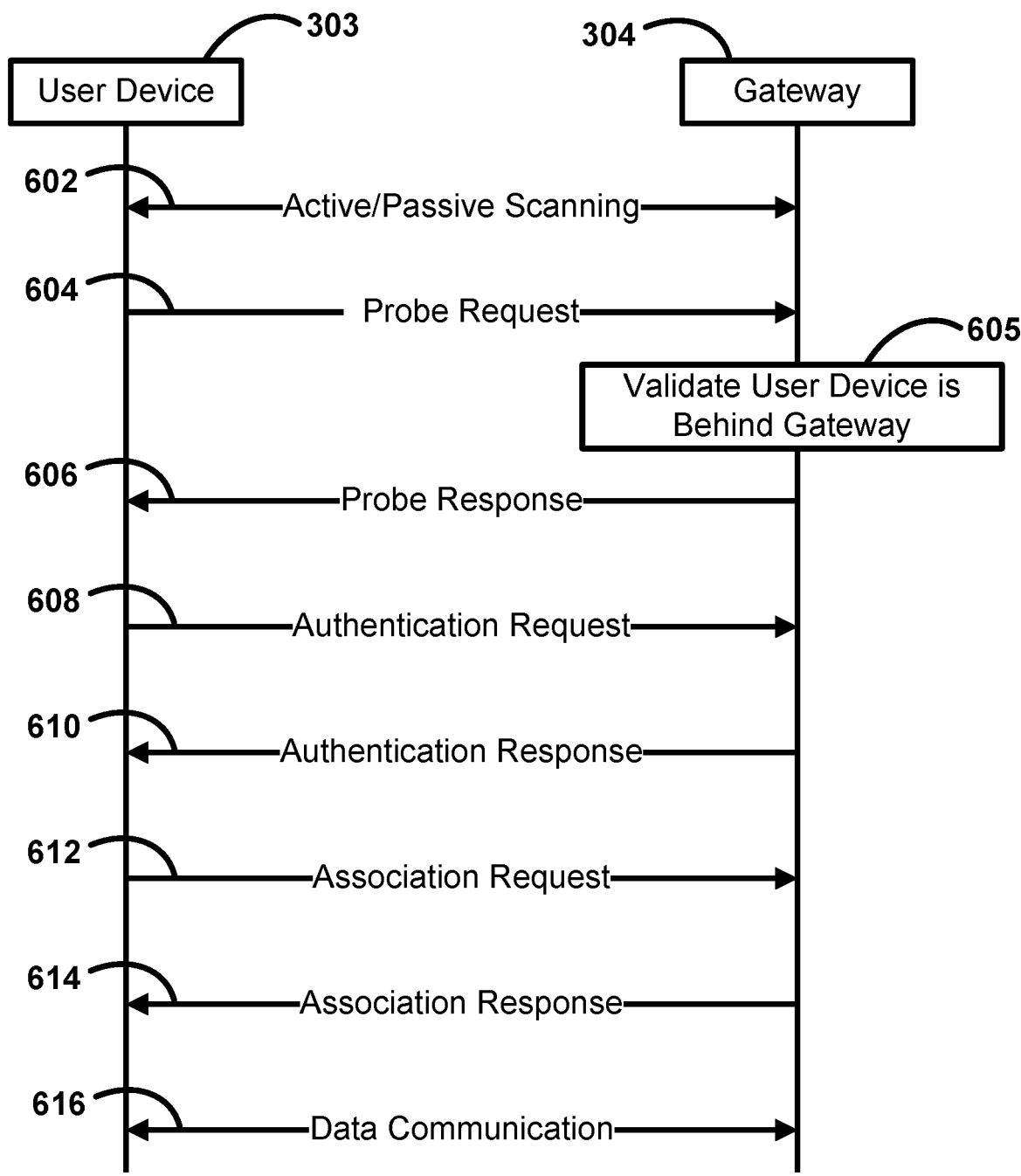
FIG. 6 is a communication flow diagram of an example method.

As a further example, a digital fingerprint can be determined representing habits, preferences, or historical associations of a particular device or user. As such, the nodes 302*a*, 302*b*, 302*c*, 302*d* and/or the gateway 304 can sup-press, stagger, or delay a the transmission 312 (e.g., public SSID) in favor of the transmission signal 313 (e.g., private SSID) during the expected duration when a device having a particular client MAC address will return home (e.g., premises 311 (FIG. 3)), as illustrated in FIG. 5. Alternatively or additionally, a state table can be used to issue a targeted probe response upon receipt of client traffic originating from behind the home wireless gateway via the DOCSIS network, as illustrated in FIG. 6. As such, the gateway can either disconnect/de-authenticate if the client is already connected to a non-home SSID. The gateway can then issue a probe response directly to the client MAC to associate to the proper SSID (e.g., Home network).

FIG. 4 illustrates a communication flow diagram of a method of rejecting a network request such as a probe request. At 402, a first probe request can be transmitted from the user device 303 and received by the gateway 304. The first probe request can be associated with a network identifier. For example, when in proximity of the gateway 304, the user device 303 can receive a beacon from the gateway 304 and can transmit the probe request based on the beacon (e.g., network identifier). As a further example, the probe request frame of the request can comprise the source address and MAC of the user device 303, and the network identifier (e.g., SSID) for which the request is probing. At a control frame level, the 802.xx probe request comprises a frame with a subtype ID of 0100 (identifying it as a probe request frame). When the WiFi chipset or interface of the gateway 304 (or other network device) receives this frame subtype, the gateway 304 can determine a network identifier from the frame body. If the network identifier relates to a first network (e.g., private network), the probe request is processed in a standard 802.xx process. If the network identifier relates to a second network (e.g., public network), then the gateway can reject the probe request, at 403, such as responding with a NULL probe response.

At 404, a second probe request can be transmitted from the user device 303 and received by the gateway 304. The second probe request can be associated with a network identifier. For example, when in proximity of the gateway 304, the user device 303 can receive a beacon from the gateway 304 and can transmit the probe request based on the beacon (e.g., network identifier). If the network identifier relates to a first network (e.g., private network), the probe request is processed in a standard 802.xx process, for example transmitting a probe response to initiation authentication and association at 406.

Authentication can comprise the user device 303 establishing its identity with an Access Point (AP) such as the gateway 304. Authentication can comprise open system authentication, shared key authentication, and/or other authentication procedures. At 408, an authentication request can be transmitted from the user device 330 and received by the gateway 304. The authentication request can comprise the user device identifier (typically the MAC address). This is followed by an authentication response from the gateway 304 comprising a success or failure message, at 410.

Once authentication is complete, the user device 303 can associate (register) with an AP/router (e.g., the gateway 304) to gain full access to the network. Association allows the AP/router/gateway to record each device so that frames may be properly delivered. As an example, after the user device 303 authenticates to the gateway 304, it sends an association request, at 412. The gateway 304 processes the association request. Various implementations for deciding whether or not a client request should be allowed can be used. When the gateway 304 grants association, it can respond with a status code of 0 (successful) and the Association ID (AID), at 414. Failed association requests can include only a status code and the procedure ends. Once the association is complete, the gateway 304 can forward frames to/from the user device 303 and the network, at 416.

FIG. 5 illustrates a communication flow diagram of a method of selectively suppressing or allowing a network request such as a probe request. At 502, the gateway 304 can transmit one or more beacons advertising one or more network identifiers (e.g., SSID). A device such as the user device 303 can scan an area for such advertised beacons. Once the user device discovers a beacon, the user device 303 can transmit a probe request to initiate association with a network serviced via the gateway 304. For example, when in proximity of the gateway 304, the user device 303 can receive a beacon from the gateway 304 and can transmit the probe request based on the beacon (e.g., network identifier). As a further example, the probe request frame of the request can comprise the source address and MAC of the user device 303, and the network identifier (e.g., SSID) for which the request is probing. At a control frame level, the 802.xx probe request comprises a frame with a subtype ID of 0100 (identifying it as a probe request frame). When the WiFi chipset or interface of the gateway 304 (or other network device) receives this frame subtype, the gateway 304 can determine a network identifier from the frame body. If the network identifier relates to a first network (e.g., private network), the probe request is processed in a standard 802.xx process. If the network identifier relates to a second network (e.g., public network), then the gateway can reject the probe request, such as responding with a NULL probe response. This selective suppressing and allowing of probe request is illustrated at 503.

At 504, a probe request can be transmitted from the user device 303 and received by the gateway 304. The probe request can be associated with a network identifier. For example, when in proximity of the gateway 304, the user device 303 can receive a beacon from the gateway 304 and can transmit the probe request based on the beacon (e.g., network identifier). If the network identifier relates to a first network (e.g., private network), the probe request is processed in a standard 802.xx process, for example transmitting a probe response to initiation authentication and association at 506.

Authentication can comprise the user device 303 establishing its identity with an Access Point (AP) such as the gateway 304. Authentication can comprise open system authentication, shared key authentication, and/or other authentication procedures. At 508, an authentication request can be transmitted from the user device 330 and received by the gateway 304. The authentication request can comprise the user device identifier (typically the MAC address). This is followed by an authentication response from the gateway 304 comprising a success or failure message, at 510.

Once authentication is complete, the user device 303 can associate (register) with an AP/router (e.g., the gateway 304) to gain full access to the network. Association allows the AP/router/gateway to record each device so that frames may be properly delivered. As an example, after the user device 303 authenticates to the gateway 304, it sends an association request, at 512. The gateway 304 processes the association request. Various implementations for deciding whether or not a client request should be allowed can be used. When the gateway 304 grants association, it can respond with a status code of 0 (successful) and the Association ID (AID), at 514. Failed association requests can include only a status code and the procedure ends. Once the association is complete, the gateway 304 can forward frames to/from the user device 303 and the network, at 516.

FIG. 6 illustrates a communication flow diagram of a method of selectively suppressing or allowing a network request such as a probe request. At 602, the gateway 304 can transmit one or more beacons advertising one or more network identifiers (e.g., SSID). A device such as the user device 303 can scan an area for such advertised beacons. Once the user device discovers a beacon, the user device 303 can transmit a probe request to initiate association with a network serviced via the gateway 304, at 604. For example, when in proximity of the gateway 304, the user device 303 can receive a beacon from the gateway 304 and can transmit the probe request based on the beacon (e.g., network identifier). As a further example, the probe request frame of the request can comprise the source address and MAC of the user device 303, and the network identifier (e.g., SSID) for which the request is probing. At a control frame level, the 802.xx probe request comprises a frame with a subtype ID of 0100 (identifying it as a probe request frame). When the WiFi chipset or interface of the gateway 304 (or other network device) receives this frame subtype, the gateway 304 can determine a network identifier from the frame body. If the network identifier relates to a first network (e.g., private network), the probe request is processed in a standard 802.xx process. If the network identifier relates to a second network (e.g., public network), then the gateway can reject the probe request, such as responding with a NULL probe response.

At 604, a probe request can be transmitted from the user device 303 and received by the gateway 304. The probe request can be associated with a network identifier. For example, when in proximity of the gateway 304, the user device 303 can receive a beacon from the gateway 304 and can transmit the probe request based on the beacon (e.g., network identifier). A response to the request can be transmitted based on a determination that the user device 303 is attempting to access a premises network device (e.g., the user is behind a home DOCIS device). The response can comprises a probe response defined in a frame field and a destination address associated with the user device 303 and may initiation authentication and association at 606.

Authentication can comprise the user device 303 establishing its identity with an Access Point (AP) such as the gateway 304. Authentication can comprise open system authentication, shared key authentication, and/or other authentication procedures. At 608, an authentication request can be transmitted from the user device 330 and received by the gateway 304. The authentication request can comprise the user device identifier (typically the MAC address). This is followed by an authentication response from the gateway 304 comprising a success or failure message, at 610.

Once authentication is complete, the user device 303 can associate (register) with an AP/router (e.g., the gateway 304) to gain full access to the network. Association allows the AP/router/gateway to record each device so that frames may be properly delivered. As an example, after the user device 303 authenticates to the gateway 304, it sends an association request, at 612. The gateway 304 processes the association request. Various implementations for deciding whether or not a client request should be allowed can be used. When the gateway 304 grants association, it can respond with a status code of 0 (successful) and the Association ID (AID), at 614. Failed association requests can include only a status code and the procedure ends. Once the association is complete, the gateway 304 can forward frames to/from the user device 303 and the network, at 616.

Figure 7:
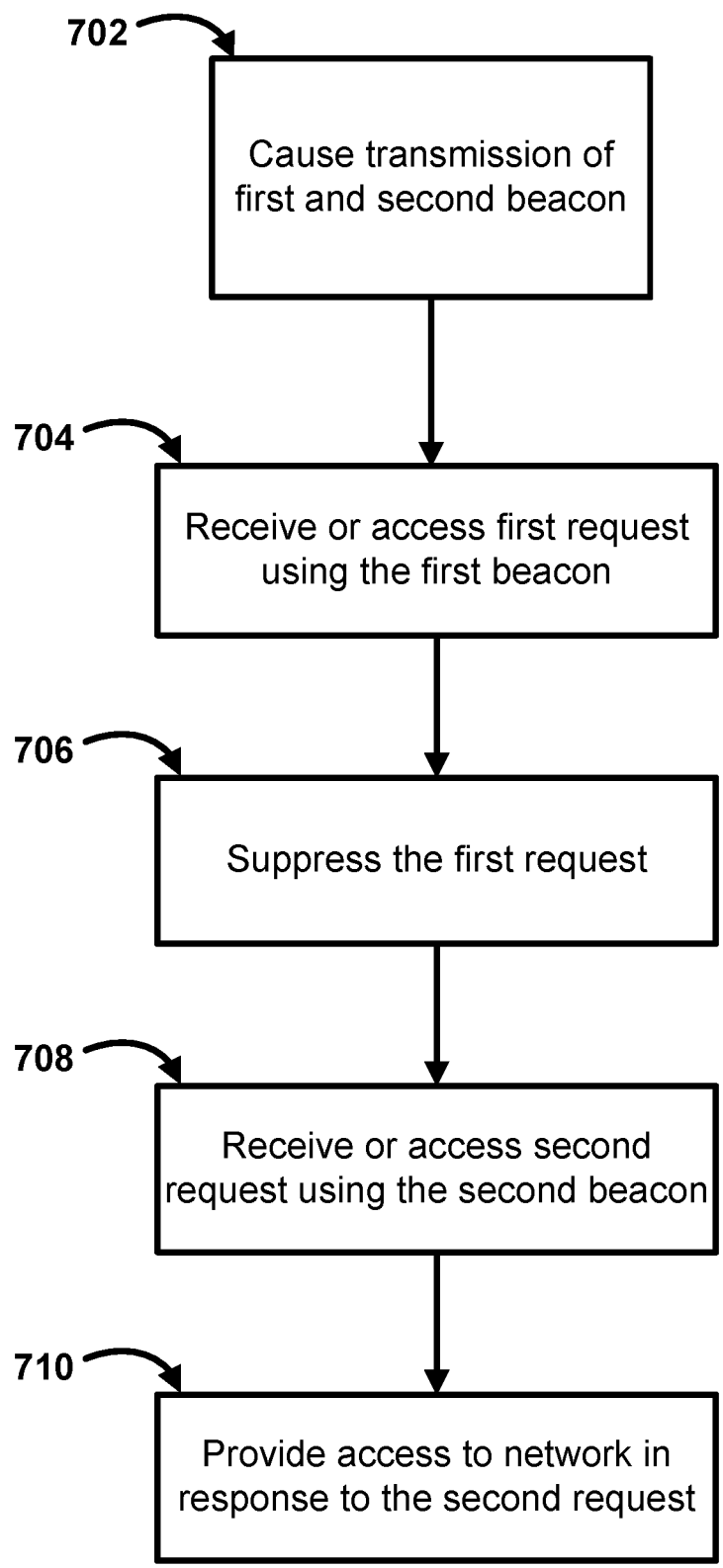
FIG. 7 is a flow chart of an example method.

An exemplary method is shown in FIG. 7. In step 702, a first beacon and a second beacon can be transmitted (e.g., broadcast). One or more of the first beacon and the second beacon comprises a network identifier, such as an SSID. As a further example, a field (e.g., subtype field) of a frame format (e.g., 802.11) can be defined to define the frame as a beacon and a data block of the frame can define the network identifier, such as an SSID, associated with the beacon. As such, various beacons and SSIDs can be transmitted to associate with one or more networks. As a further example, the first beacon can be associated with a public network (e.g., public hotspot) and the second beacon can be associated with a private network (e.g., home network).

In step 704, a first request can be received or accessed, where the first request is associated (e.g., in response to) with the first beacon. The first request can be received or accessed from a first device (e.g., user device) associated with an identifier (e.g., MAC address, an IP address, a network identifier, etc.). As an example, the first request can be or comprise a probe request (e.g., subtype filed defined as probe request).

In step 706, the first request (e.g., probe request) can be suppressed. Such suppression may be in favor of another communications such as another request. For example, a probe request associated with an network identifier of a public network may be suppressed in favor a subsequent probe request associated with a network identifier of a private (home) network. The suppressing the first request can comprise rejecting or delaying the first request.

Suppression of the first request can be executed within the standard behavior of 802.xx wife scanning. The 802.xx association procedure can be generalized as a three stage process of: 1) probe, 2) authentication, and 3) association. As an example implementation, a mobile device can probe for beacons. When in proximity of a wireless gateway, the mobile device can receive the beacon and can transmit a probe request based on the beacon (e.g., network identifier). The probe request frame can comprise the source address and MAC of the mobile device, and the network identifier (e.g., SSID) for which the request is probing. At a control frame level, the 802.xx probe request comprises a frame with a subtype ID of 0100 (identifying it as a probe request frame). When the WiFi chipset or interface of the wireless gateway (or other network device) receives this frame subtype, the gateway can determine a network identifier from the frame body. If the network identifier relates to a first network (e.g., private network), the probe request is processed in a standard 802.xx process. If the network identifier relates to a second network (e.g., public network), then the gateway can suppress the probe request, such as responding with a NULL probe response, or ignoring the request, or delaying the processing of the request by a time period. The suppression at the gateway can take the form of pseudocode that is akin to a pkt inspection, wherein the receiving device filters in on certain attributes (e.g., network identifier) and then executes operations (e.g., suppression) in response to the attributes. The network device (e.g., gateway) can flush itself from its internal cache so that when a user leaves and comes back, their mobile device will go through the same probe/association process again.

The suppressing the first request can be dependent upon the identifier associated with the first device, such as to limit the suppression for requests received from particular devices. As explained above, a probe request frame can comprise the source address and MAC of the mobile device, and the network identifier (e.g., SSID) for which the request is probing. Logic at the gateway can be execute to determine a identifier of the device transmitting the probe request and can customize operations based on the particular device. For example, a user within range of a wireless gateway may connect to a home network with their personal device, but guests to the premise may connect to a public network via the same gateway. Using device identifiers, the gateway can parse the source of the probe requests and can alter the 802.xx association process based on the device identifier.

In step 708, a second request can be received or accessed using the second beacon. The second request can be received or accessed from the first device (e.g., user device) associated with the identifier (e.g., MAC address). As an example, the second request can be or comprise a probe request (e.g., subtype filed defined as probe request).

In step 710, access to a network can be provided in response to the second request. As an example, a response to the second request can be transmitted to the first device, which can initiate an authentication and/or association process to facilitate network communication between the first device and a network device.

In operation, a user may associate a user device with a public network via a public hotspot outside the home. When the user returns home with the device, the user device may receive a network identifier associated with the public network, but via a home gateway device. If the user device associates with the public network, certain private network services may not be available to the user. By rejecting a probe request associated with the public network identifier, the user device is forced to transmit another probe request. As the user device scans for a network identifier, the user device can receive a beacon associated with a private network. The user device can then transmit a new probe request and the gateway can process the probe request normally, thereby associating the user device with the private network.

Figure 8:
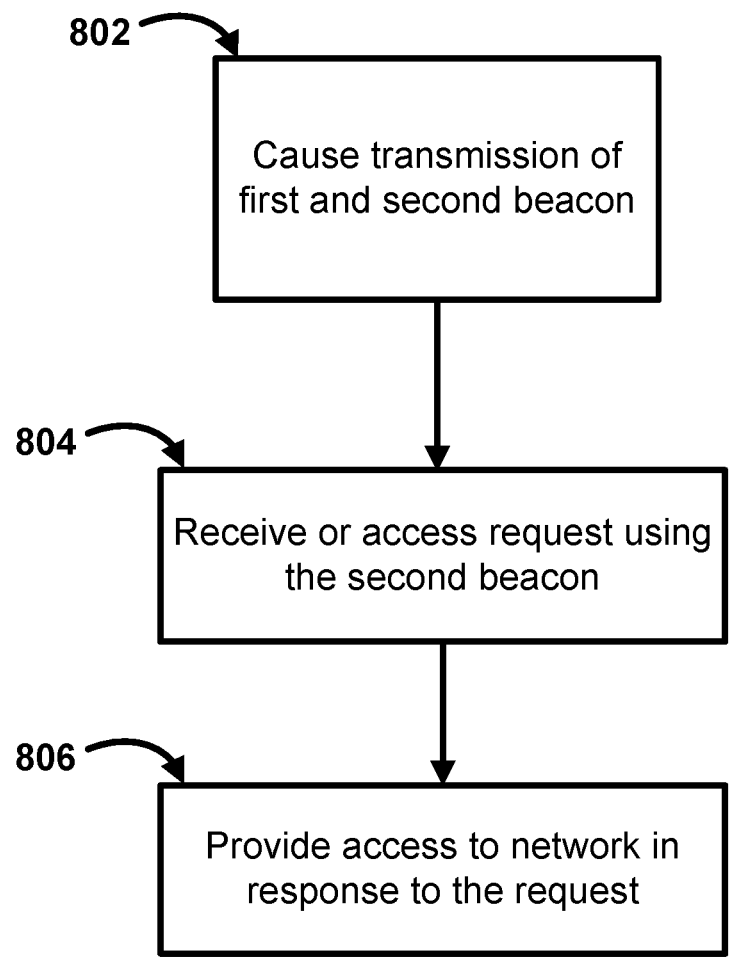
FIG. 8 is a flow chart of an example method.

An exemplary method is shown in FIG. 8. In step 802, a first beacon and a second beacon can be transmitted (e.g., broadcast). As an example, one or more of the first beacon and the second beacon comprises a network identifier, such as an SSID. As a further example, a field (e.g., subtype field) of a frame format (e.g., 802.11) can be defined to define the frame as a beacon and a data block of the frame can define the SSID associated with the beacon. As such, various beacons and SSIDs can be transmitted to associate with one or more networks. As a further example, the first beacon can be associated with a public network (e.g., public hotspot) and the second beacon can be associated with a private network (e.g., home network).

The transmission of the second beacon can be prioritized over the first beacon. For example, the transmission of the second beacon is prioritized over the first beacon by increasing a frequency of transmission of the second beacon. As another example, the transmission of the second beacon is prioritized over the first beacon by suppressing (e.g., delaying, inhibiting) the transmission of the first beacon. As a further example, the transmission of the second beacon is prioritized over the first beacon based at least on a digital fingerprint associated with the user device or a user of the user device. The digital fingerprint can be determined representing habits, preferences, or historical associations of a particular device or user.

The digital fingerprint can be stored locally to the network device transmitting the beacons or can be stored elsewhere and accessed by the network device. As explained above, a probe request frame can comprise the source address and MAC of the mobile device, and the network identifier (e.g., SSID) for which the request is probing. Logic at the gateway can be execute to determine a identifier of the device transmitting the probe request and can customize operations based on the particular device. As such a network device can suppress, stagger, or delay transmission or access to one SSID over another SSID, such as a public SSID in favor of a private SSID, based on the device identifier and the digital fingerprint associated with the device identifier. In certain implementations, the digital fingerprint may include information relating to habits of the user, such as time frames when a particular user may be in proximity to the network device. As such, during the expected time frames and time durations when a device having a particular client MAC address will be home, a wireless gateway may suppress a network identifier of a public network in favor of a private network.

In step 804, a request can be received or accessed based on the second beacon. The request can be received or accessed from the first device (e.g., user device) associated with the identifier (e.g., MAC address). As an example, the second request can be or comprise a probe request (e.g., subtype filed defined as probe request).

In step 806, access to a network can be provided in response to the request. As an example, a response to the request can be transmitted to the first device, which can initiate an authentication and/or association process to facilitate network communication between the first device and a network device.

In operation, a user may associate a user device with a private network via a gateway in the home. When guest to the home enter with a guest device, the guest device may receive a network identifier associated with the private network. If the user device associates with the private network, certain private network security authorization may be required. By suppressing a probe request associated with the private network identifier, the guest device is forced to transmit another probe request. As the guest device scans for a network identifier, the guest device can receive a beacon associated with a public network. The guest device can then transmit a new probe request and the gateway can process the probe request normally, thereby associating the guest device with the public network.

Figure 9:
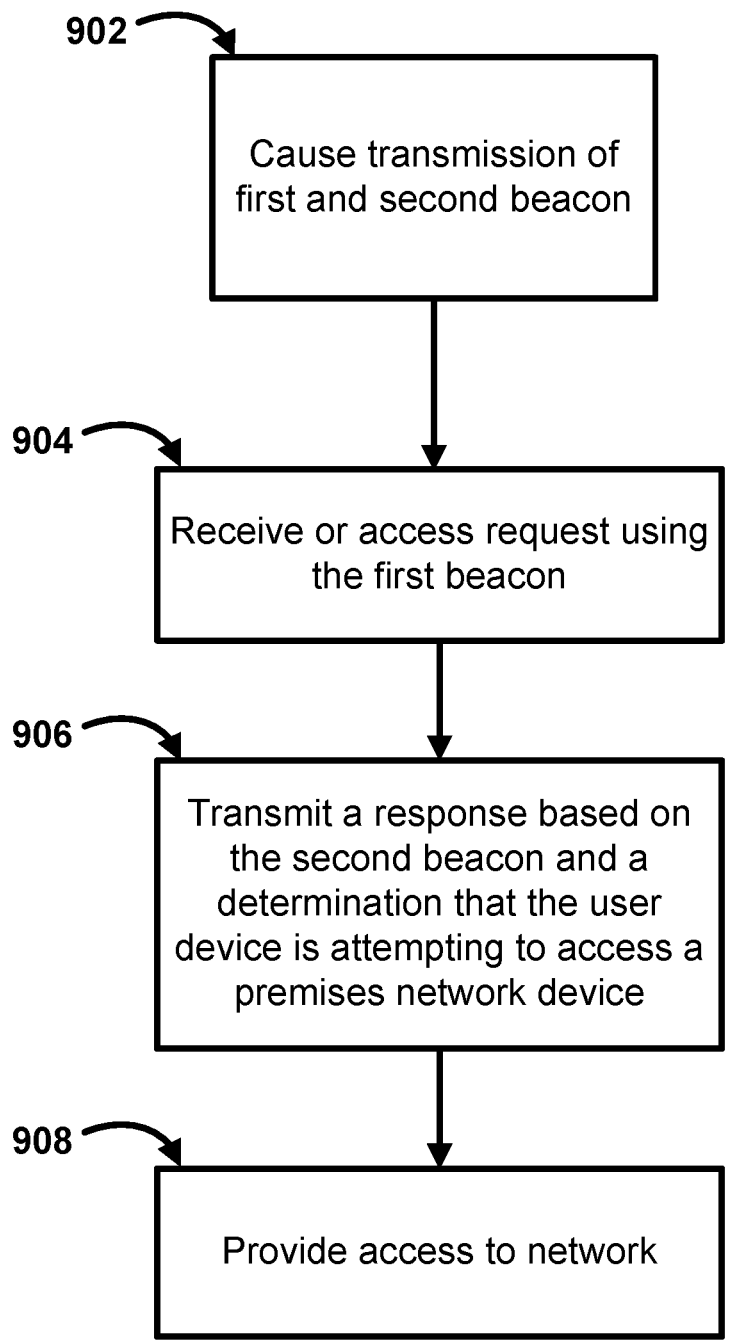
FIG. 9 is a flow chart of an example method.

An exemplary method is shown in FIG. 9. In step 902, a first beacon and a second beacon can be transmitted (e.g., broadcast). As an example, one or more of the first beacon and the second beacon comprises a network identifier, such as an SSID. As a further example, a field (e.g., subtype field) of a frame format (e.g., 802.11) can be defined to define the frame as a beacon and a data block of the frame can define the SSID associated with the beacon. As such, various beacons and SSIDs can be transmitted to associate with one or more networks. As a further example, the first beacon can be associated with a public network (e.g., public hotspot) and the second beacon can be associated with a private network (e.g., home network).

In step 904, a request can be received or accessed based on the first beacon. The request can be received or accessed from a first device (e.g., user device) associated with an identifier (e.g., MAC address). As an example, the request can be or comprise a probe request (e.g., subtype filed defined as probe request).

In step 906, a response to the request can be transmitted based on the second beacon and a determination that the user device is attempting to access a premises network device (e.g., the user is behind a home DOCIS device). The response can comprises a probe response defined in a frame field and a destination address associated with the user device.

In step 908, access to a network can be provided based on the response. As an example, the response to the request can be transmitted to the first device, which can initiate an authentication and/or association process to facilitate network communication between the first device and a network device.

In operation, when a mobile device is in proximity of the residential wireless gateway and it associates before the gateway has the ability to direct the user device to a different SSID. This behavior is somewhat common in the sense that we are not prohibiting the default behavior of WiFi scanning process: probe, authentication, and association. In parallel to this process, traffic is being sent from the mobile device via the home wireless gateway. As such, the has the ability to correlate the source traffic is coming from a mobile device from behind a home device (e.g., DOCSIS device). Based on such a correlation, the mobile device is determined to be at home and the user may prefer to connect to a home SSID. If the mobile device has already associated with a network that is not the home network, the gateway can send a disassociation/deauthentication frame and may issue a targeted probe response to force a association with the preferred network.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded on a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   causing, by a network device, transmission of a first beacon and a second beacon, wherein the first beacon is associated with a public wireless network, and wherein the second beacon is associated with a private wireless network;
   receiving, via the network device, and from a user device, a first request associated with the first beacon;
   suppressing, via the network device, and based on a digital fingerprint including historical time frames during which the user device is in proximity to the private wireless network, the first request such that the user device is caused to transmit a second request associated with the second beacon;
   receiving the second request from the user device; and
   providing access to the private wireless network in response to reception of the second request.

2. The method of claim 1, wherein the suppressing the first request comprises rejecting the first request.

3. The method of claim 1, wherein the suppressing the first request comprises delaying the first request.

4. The method of claim 1, wherein the suppressing the first request is further based on an identifier associated with the user device.

5. The method of claim 4, wherein the identifier comprises a media access control (MAC) address.

6. The method of claim 1, wherein the first beacon or the second beacon comprises a network identifier.

7. The method of claim 1, wherein causing transmission of the first beacon and the second beacon comprises prioritizing the transmission of the second beacon over the first beacon by increasing a frequency of transmission of the second beacon.

8. A method comprising:
   causing transmission, to a user device, of a first beacon associated with a public wireless network and a second beacon associated with a private wireless network, wherein the transmission of the second beacon is prioritized over the first beacon based on a digital fingerprint including historical time frames during which the user device is in proximity to the private wireless network;
   receiving a request from the user device associated with the second beacon; and
   providing access to the private wireless network in response to reception of the request.

9. The method of claim 8, wherein the transmission of the second beacon is prioritized over the first beacon by increasing a frequency of transmission of the second beacon.

10. The method of claim 8, wherein the transmission of the second beacon is prioritized over the first beacon by suppressing the transmission of the first beacon.

11. The method of claim 8, wherein the first beacon or the second beacon comprises a service set identifier (SSID).

12. A method comprising:
  causing, by a premises network device, transmission of a first beacon and a second beacon, wherein the first beacon is associated with a public wireless network, and wherein the second beacon is associated with a private wireless network;
  receiving, via the premises network device, and from a user device, a request associated with the first beacon;
  transmitting, via the premises network device, and based on at least an identifier associated with the user device and a digital fingerprint including historical time frames during which the user device is in proximity to the private wireless network, a response to the request, wherein the response is associated with the second beacon; and
  providing, to the user device, via the premises network device, and based on the response associated with the second beacon, access to the private wireless network.

13. The method of claim 12, wherein the identifier associated with the user device comprises a media access control (MAC) address.

14. The method of claim 12, wherein the response comprises a probe response defined in a frame field and a destination address associated with the user device.

15. The method of claim 12, wherein the first beacon or the second beacon comprises a service set identifier (SSID).

16. The method of claim 12, wherein causing transmission of the first beacon and the second beacon comprises prioritizing the transmission of the second beacon over the first beacon by increasing a frequency of transmission of the second beacon.

* * * * *